Aug. 22, 1933.  D. V. EDWARDS  1,924,058
EXCITER LAMP FOR PHOTO-ELECTRIC CELLS
Filed July 23, 1930  2 Sheets-Sheet 1

INVENTOR
Donald V. Edwards
BY
Edwards, Bower & Pool
ATTORNEYS

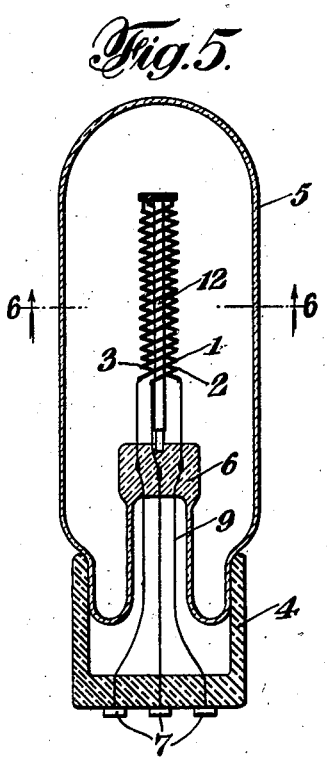
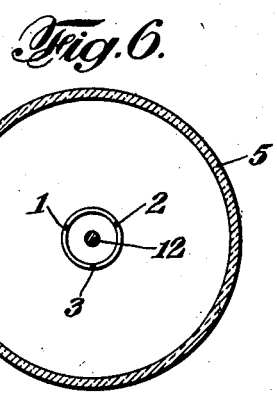
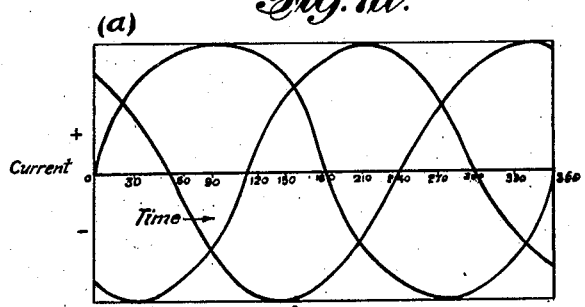
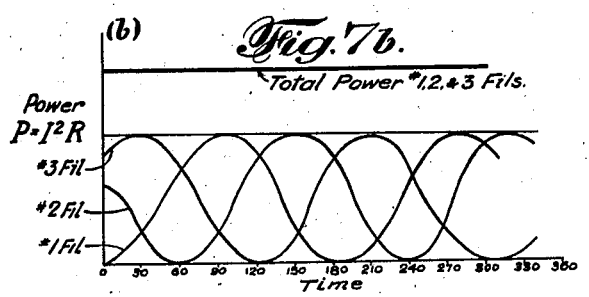
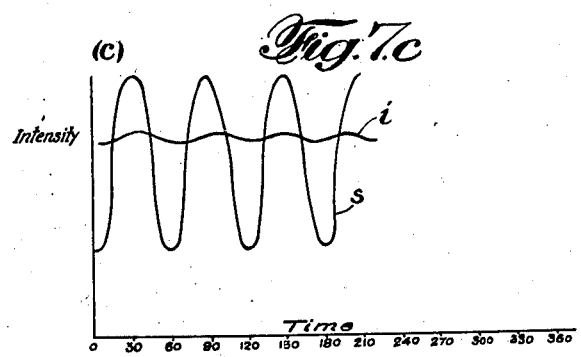
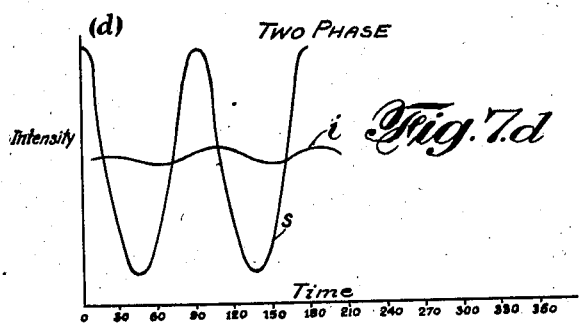

Patented Aug. 22, 1933

1,924,058

UNITED STATES PATENT OFFICE 1,924,058

EXCITER LAMP FOR PHOTO-ELECTRIC CELLS

Donald V. Edwards, New York, N. Y.

Application July 23, 1930. Serial No. 470,124

7 Claims. (Cl. 176—26)

This invention relates to exciter lamps for photo-electric cells, which lamps may be energized by alternating current and which are, nevertheless, adapted to give a source of light of high brilliancy and uniform intensity, such as required for projection work.

The invention contemplates a method and means whereby polyphase currents are caused to energize a plurality of filaments or other light emitting elements in an exciter lamp, the light emitted by the different filaments or elements being integrated in such manner as to take advantage of the constant power input of polyphase currents to give high brilliancy and uniform intensity.

An important object of the invention is to prevent changes in light intensity in exciter lamps energized by alternating current and to provide a lamp of this type suitable for illuminating the sound track on talking moving picture projectors to control a photo-electric cell in the reproducing system.

In the accompanying drawings, Fig. 1 is a side view, in elevation, of a lamp constructed in accordance with my invention;

Fig. 5 is another modification of my invention;

Fig. 6 is a section taken along 6—6 of Fig. 5; and

Fig. 7 shows graphically the variations in current, the power input, and variations in light intensity with polyphase currents.

In exciter lamps for illuminating the sound track on talking moving picture projectors, it is necessary to have a source of light of uniform intensity and extremely high brilliancy. This has heretofore been accomplished by employing a very heavy low voltage filament and a direct current source of supply. The use of direct current is objectionable, however, in that it is not readily obtainable, is expensive to provide, and must have a ripple of less than two percent in order to prevent changes in light intensity from being picked up by the photo-electric cell in the reproducing system, which changes when amplified produce an audible hum in the loud speaker.

Attempts have been made to avoid the use of direct current by employing an alternating current lamp having high wattage and by an indirect heating arrangement similar to the cathode and heater elements of A. C. radio tubes. So far, however, this has resulted in a sacrifice in brilliancy, and also introduces an objectionable amount of hum in the reproducing system. Also, it is necessary to operate these tubes at such high temperatures that they are exceedingly short-lived, and as they are expensive the replacement of tubes every few hours adds materially to the cost of reproduction. The failure of these tubes furthermore causes frequent interruption of the program.

In my invention I use a plurality of filaments in each lamp connected to a polyphase supply line to give a constant power input throughout the cyclic period of the current, the energy radiated by the heated filaments being integrated so that light of uniform intensity will be obtained from the unit.

The term "integration" is used in this specification to describe the act of controlling the resultant intensity of the energy radiated by a plurality of filaments at any instant. The expression "integrating effect" is used to indicate the averaging or equalizing of the radiation from a single filament or group of filaments over a period of time, such as one cycle of the heating current or a portion thereof. The term "thermal inertia" is used in this specification to describe that property of an energy emitting element by which it absorbs or stores heat when its temperature is increasing and gives up heat when its temperature is decreasing.

Figure 1:
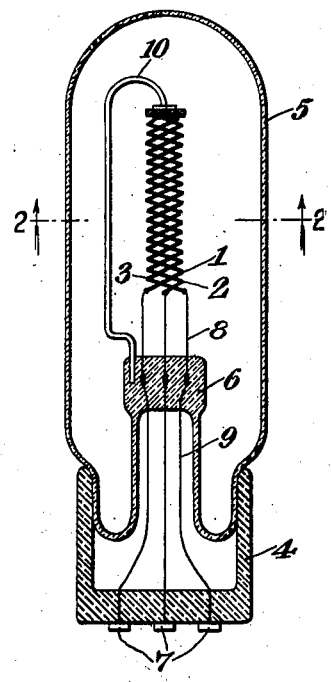

Fig. 1 shows a tubular lamp having a base 4 supporting an evacuated envelope 5 with stem 6 formed integral therewith. Three contacts 7 serve to connect the lamp to a three phase supply line. Three spirally wound filaments 1, 2 and 3 are provided, one for each phase, respectively, of the supply line. One end of each filament is connected to its corresponding contact 7 by a lead-in wire 8 and connection 9. The filaments are connected together at their upper ends to form a three-phase star connection (although they may also be connected in delta if desired), and are supported by wire 10, the lower end of which is embedded in the insulating stem.

In a polyphase circuit, although the power used by each filament passes through zero twice during each cycle, the total power input from all phases is constant. This is shown graphically in Fig. 7(a) and (b). It will be noted, however, that although the total power input of all three filaments is constant, when one filament, for example, is receiving its maximum power input, the other two in the three-phase circuit receive only one-fourth of their maximum power input. Therefore, unless each filament has a large thermal inertia, or other means are provided to integrate the energy radiated by the filaments, the light supplied by the two filaments receiving small amounts of power will be practically negligible so that the maximum intensity of light where filaments of negligible heat capacity are used, or where there is no radiation between the filaments, is that due to the one filament receiving maximum power.

Again, at a point half-way between the points of maximum intensity of any one filament, such as filament No. 3, and the maximum intensity of the next, filament No. 1, Fig. 7(b), the power input of the two filaments 1 and 3 is seventy-five percent maximum while the third filament No. 2 has no power input. The light intensity emitted by the filaments 1 and 3 at this time would be only one-third of the light intensity when one filament is receiving its maximum input.

In other words the intensity of the energy emitted at any instant by the lamp shown in Fig. 1 would be determined by the intensity of filament 1, 2 or 3 in which the current is greatest at that instant if the means described herein for integrating or equalizing the energy of the several filaments were not employed.

The foregoing conditions would, if not overcome, cause an objectionable light ripple, but I am able to substantially eliminate this ripple by using filaments having large heat storing capacity so that the thermal inertia of each provides an integrating effect throughout the cyclic period of the current. When a plurality of these filaments are arranged so that the light from each will fall on a common photo-electric cell, and polyphase currents are employed to heat the filaments, the aggregate is a light of high brilliancy and uniform intensity.

The arrangement may be made more effective by nestling, that is, disposing in closely adjacent relation or inter-relating the filaments. Preferably the filaments are coiled, as indicated at 1, 2 and 3, Figs. 1 and 5, and their turns interposed, that is, the turns of each coil are disposed between the corresponding turns of the other coils but out of electrical contact therewith, so that a large percentage of the energy radiated by any one of these filaments at the time of its maximum power input will be absorbed by the other two filaments which at that instant are receiving but a part of their maximum input. Additional integration of emitted energy is obtained by causing the energy radiated by the filaments 1, 2 and 3 to be absorbed by a common light emitting element having high heat capacity. With either of these integrating arrangements the total energy output of both heat and light of each of the filaments 1, 2 and 3 is appreciably increased at their respective times of minimum power input while the amount of energy radiated from the lamp by any one of the filaments at the time of its maximum power input is reduced. The result is a substantially constant intensity of illumination. The improved energy emitting characteristic of a lamp such, for example, as shown in Fig. 1 which may be obtained by integrating the energy emission of the filaments 1, 2 and 3 is illustrated in Fig. 7c. The abscissae represent electrical degrees, the total of 360 degrees being equal in time to one cycle of the energizing current. The ordinates represent the relative intensities of the light emitted by the group of filaments. Graph s shows how this intensity would vary during a portion of one cycle of the energizing current if the filaments 1, 2 and 3 of Fig. 1 had very little thermal inertia and if there were substantially no interchange of energy among them. Under these conditions each filament in turn emits energy at maximum intensity when it receives maximum power, which intensity is much greater than the intensity obtained from the group of filaments during the intervening periods when each filament is receiving less than maximum power. The peaks and valleys of graph s, therefore, correspond in time phase with the successive peaks and valleys formed by the upper portions of the power curves of filaments Nos. 1, 2 and 3 shown in Fig. 7b. Graph i shows the substantially contant intensity obtained by using filaments 1, 2 and 3 having considerable thermal inertia and arranging these filaments to facilitate an interchange of radiant energy among them, in accordance with this invention.

Referring to Fig. 1, each of the three filaments 1, 2 and 3 has sufficient mass to insure a high heat capacity so that at the time of maximum power input a large percentage of the energy is stored in the metal due to the lag between the temperature of the metal and the rate of energy input. On the reverse, when the energy input is at a minimum value the heat thus stored is emitted as light energy. Due to the specific heat and the mass of material in each filament the thermal inertia of the same gives an integrating action with respect to the light emitted, and it is possible when a plurality of such filaments are used with polyphase currents to reduce the variation in light intensity to an amount below that permissible for reproduction purposes.

A greater degree of refinement may be obtained by nestling the filaments in good heat interchange relation. There is thus provided an additional integration of emitted energy because when any filament is receiving maximum power from the supply line, a portion of the energy emitted is radiated to the other two filaments which at that instant are receiving less power, so that the intensity of the total light emitted by the lamp at any instant is determined by the integral of the energy radiated by each of the filaments throughout the cyclic period of the supply current. The exact size and length of the filaments and the spacing between them will depend upon various factors such as the number of phases and the current and voltage values of the power supply, the composition and characteristics of the filaments themselves, and the degree of exhaustion of the tube or the nature of the gas in a gas filled tube.

Figure 3:
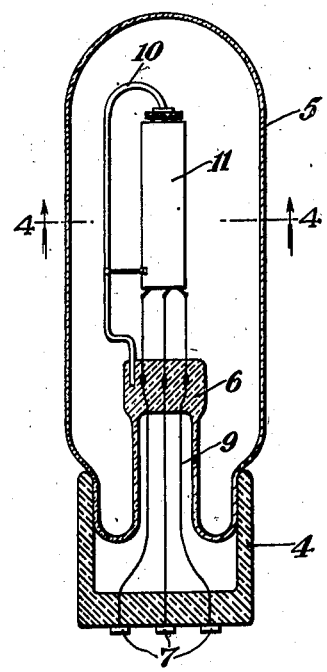
Fig. 3 is a modification of Fig. 1.
Figure 2:
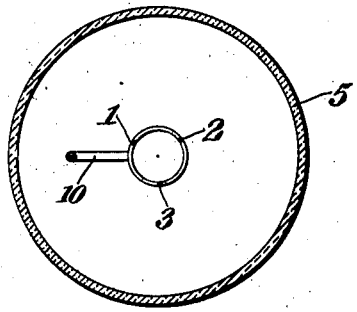
Fig. 2 is a section taken along 2—2 of Fig. 1.
Figure 4:
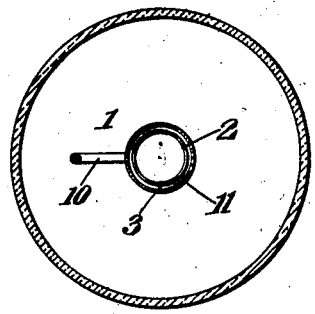
Fig. 4 is a section taken along 4—4 of Fig. 3.

Figure 3 is a modification in which the filaments 1, 2 and 3 are surrounded by a light emitter 11 of tungsten or other suitable material. Since the power radiated to the emitter will be constant, its temperature will be constant and therefore the brilliancy or intensity of illumination given out by it will be constant. This construction is ideal from a ripple point of view, but the heater filaments must be maintained at higher temperatures than the light emitter to compensate for the temperature drop from filament to emitter.

In an exciter lamp for talking moving picture reproduction it does not matter materially whether the hot surface which emits the light is composed of alternately high and low intensity areas closely adjacent, or whether it is composed of a uniform surface of even intensity, the important consideration being that the total amount of light from the lamp falling on the slit in front of the moving picture film should be constant. The construction of Fig. 3 can therefore be modified to give the arrangement of Fig. 5 in which a central heat integrating member 12 of tungsten or other suitable material is surrounded by loosely spiralled filaments. Inasmuch as we are dealing with pure radiation, the energy radiated from the filaments can be concentrated in the emitting member on the inside of the coiled filaments and this integrating member will have a higher temperature than the mean temperature of filaments themselves. By properly proportioning the amount of its surface receiving radiation from the filaments, and the amount of opening between the filaments to permit the emission of light from its surface, the temperature of this integrating emitter can be controlled to prevent over-heating of the filament wires themselves. The emitter may also comprise a support for the filaments as shown in the figure.

While I have described my invention in connection with three phase current, various other polyphase currents may be used. Referring to Fig. 7(c) it will be seen that the period of time between the instants of maximum input with three phase current is equal to sixty electrical degrees. Two phase current may also be used but as shown in Fig. 7(d) this time period will then be increased to ninety electrical degrees, and therefore to maintain a certain maximum value of ripple a filament of larger heat capacity is required than with a three phase supply. An increase in the number of phases or the frequency of the power supply will permit a decrease in the heat capacity necessary to smooth out a given ripple.

Any of the various means known in the art may be used to prevent sagging or accidental contact between adjacent filaments if necessary, and it may be desirable to insert some insulating means having high thermal conductivity between the filaments to facilitate heat interchange.

While I have described my invention by applying the same to an exciter lamp for photo-electric cells, I do not wish to be limited thereto since various other uses, modifications and equivalent arrangements will readily suggest themselves to those skilled in the art without the exercise of inventive skill and without departing from the spirit and scope of my invention. For example, my invention may be applied to radio tubes or other hermetically sealed tubes, in which it is desirable to have an emitter radiate energy of uniform intensity, and I regard such arrangements as coming within the scope of my invention.

I claim:

1. A polyphase lamp comprising a plurality of spiralled filaments of substantially equal dimensions disposed on a common axis with their turns interposed and in spaced relation and adapted to be energized simultaneously, a common connection at one end of each of said filaments, and a separate connecting lead attached to the opposite end of each of said filaments.

2. An exciting polyphase lamp for a photo-electric cell comprising a plurality of filaments shaped to form a single multi-thread helix, each of said filaments forming one thread thereof, the said filaments being adapted to be energized simultaneously and electrically insulated from each other at all points intermediate their ends, and means for energizing said filaments from a polyphase source of current.

3. A polyphase exciting lamp for a photo-electric cell, comprising a plurality of filaments of large heat capacity in the form of coils of substantially equal dimensions, the turns of the respective coils being interposed and electrically insulated from each other, and means for energizing said filaments simultaneously from a polyphase source of current.

4. A polyphase exciting lamp for a photo-electric cell, comprising a plurality of filaments of large heat capacity, said filaments being formed into coils of substantially equal dimensions with their turns electrically insulated from each other and interposed, thereby facilitating the radiation of heat from one to another of said filaments, and supplemental means for absorbing radiant energy from the filaments and emitting a portion of said energy as light, said means being disposed in adjacent symmetrical relation to each of the filaments.

5. A polyphase emitter of radiant energy comprising a plurality of spiral filaments of substantially equal dimensions disposed symmetrically about a common axis with their turns interposed in spaced relation and out of electrical contact with each other, a support co-incident with said axis, each filament being connected at one end to said support, and separate leads connected to the opposite ends of the filaments.

6. A polyphase incandescent lamp having a plurality of coiled filaments each adapted to form a band of light of substantially the same size and adapted to be energized simultaneously, the said filaments being electrically insulated from each other at all points intermediate the ends thereof and disposed relative to each other so that, in operation, the bands of light formed by all of the filaments are substantially co-incident in space.

7. A polyphase hermetically sealed emitter comprising a plurality of energy emissive filaments in the form of coils of substantially equal dimensions and adapted to be energized simultaneously, the turns of said coils being interposed in closely spaced relation but out of electrical contact with each other, thereby facilitating interchange of radiant energy among said filaments, and terminals for said filaments adapted to connect them to a ployphase supply.

DONALD V. EDWARDS.